United States Patent [19]

Chang et al.

[11] Patent Number: 4,540,766
[45] Date of Patent: Sep. 10, 1985

[54] THERMOSETTING HIGH SOLIDS SOLVENT-BASED POLYESTER-URETHANE ONE-COMPONENT COATING COMPOSITIONS

[75] Inventors: Wen-Hsuan Chang, Gibsonia; Ronald R. Ambrose, Allison Park; David T. McKeough, Gibsonia; Samuel Porter, Jr., Natrona Heights; Delano R. Eslinger, Gibsonia, all of Pa.

[73] Assignee: PPG Industries, Inc., Pittsburgh, Pa.

[21] Appl. No.: 538,631

[22] Filed: Oct. 3, 1983

[51] Int. Cl.$^3$ .............................................. C08G 18/80
[52] U.S. Cl. ......................................... 528/45; 528/81; 528/83
[58] Field of Search ............................... 528/45, 81, 83

[56] References Cited

U.S. PATENT DOCUMENTS

| | | | |
|---|---|---|---|
| 2,871,218 | 1/1959 | Schollenberger | 260/45.4 |
| 2,953,539 | 9/1960 | Keplinger et al. | 260/31.6 |
| 3,015,650 | 1/1962 | Schollenberger | 260/75 |
| 3,094,510 | 6/1963 | Parker et al. | 260/75 |
| 3,326,861 | 6/1967 | Sandridge | 260/75 |
| 3,446,771 | 5/1969 | Matsubayashi et al. | 260/45.85 |
| 3,503,932 | 3/1970 | Reuter | 260/75 |
| 3,538,055 | 11/1970 | Camilleri et al. | 260/75 |
| 3,541,183 | 11/1970 | Kallert et al. | 260/858 |
| 3,664,979 | 5/1972 | Tanomura et al. | 260/75 NK |
| 3,804,810 | 4/1974 | Fryd | 260/75 NK |
| 3,838,105 | 9/1974 | Brachman | 260/75 NP |
| 3,862,093 | 1/1975 | Jellinek et al. | 260/75 EP |
| 3,882,189 | 5/1975 | Hudak | 260/850 |
| 3,900,446 | 8/1975 | McClung et al. | 260/75 NT |
| 3,912,790 | 10/1975 | Chang et al. | 260/849 |
| 3,959,201 | 5/1976 | Chang | 260/29.4 R |
| 3,962,522 | 6/1976 | Chang et al. | 428/423 |
| 4,111,913 | 9/1978 | Schuhmacher et al. | 528/273 |
| 4,165,345 | 8/1979 | Smith et al. | 525/419 |
| 4,169,196 | 9/1979 | Ehrlich et al. | 528/58 |
| 4,174,436 | 11/1979 | Korlatzki et al. | 528/80 |
| 4,248,996 | 2/1981 | Sterzel et al. | 528/272 |
| 4,387,194 | 6/1983 | Ottaviani et al. | 525/454 |

*Primary Examiner*—Maurice J. Welsh
*Attorney, Agent, or Firm*—Godfried R. Akorli

[57] ABSTRACT

This invention encompasses a high solids, solvent-based, thermosetting composition having the necessary hardness and flexibility that make it an effective coating for both elastomeric and hard metal substrates. The composition comprises a polyester-urethane polyol and a curing agent such as an aminoplast.

25 Claims, No Drawings

THERMOSETTING HIGH SOLIDS SOLVENT-BASED POLYESTER-URETHANE ONE-COMPONENT COATING COMPOSITIONS

BACKGROUND OF THE INVENTION

1. Field of the Invention

The present invention relates to thermosetting, solvent-based resinous compositions. More specifically, the invention relates to thermosetting, solvent-based, high solids coatings comprising polyester-urethane polymers that are useful in coating both elastomeric and metal substrates.

2. Brief Description of the Prior Art

There are known in the art coating compositions that can be applied to elastomeric substrates. These coating compositions are characterized by excellent flexibility, particularly at low temperatures. Illustrative of these coating compositions are those based on polyester-urethane polyols of relatively high molecular weight which are cured with aminoplasts. Another illustration of these coating compositions are those based on polymeric polyols such as soft polyurethane polyols cured with a stoichiometric excess of an aminoplast curing agent. Yet another illustration of these coating compositions are those comprising thermosetting resins, for example, hard polyester polyols, soft polyurethane polyols and aminoplast curing agents. It has been found that while these elastomeric coatings have a reasonable degree of hardness, they are not sufficiently hard to be used effectively on hard metal substrates.

Coating compositions that can be applied to hard metallic substrates are known in the art. These coating compositions are characterized by excellent hardness. An illustration therefor are coating compositions based on polyester polyols and acrylic polymers cured with aminoplasts or isocyanates. These metallic coatings, generally, are not flexible enough to be used effectively on elastomeric parts.

In this state of the art, an article, with metallic and elastomeric parts, requires two types of coatings: one suitable for elastomeric parts and the other suitable for metallic parts. This requirement presents problems of color-matching of the different parts. Those skilled in the art would appreciate how difficult it is to prepare coating compositions having, conjointly, the properties of flexibility, durability and hardness. It would be all the more difficult to prepare high solids compositions having the conjoint properties. This invention provides a high solids coating composition, the cured coating of which has, conjointly, excellent properties of flexibility, durability and hardness which make it useful on both elastomeric and hard metal parts.

SUMMARY OF THE INVENTION

In accordance with the foregoing, the present invention encompasses a high solids, solvent-based, thermosetting, one-component coating composition having a sprayability of at least 40 percent, which when cured is flexible and hard in that when the coating composition is deposited on an elastomeric substrate and cured, the coated substrate can be bent around a ½-inch mandrel with the coating facing outwardly and the coating exhibits substantially no breaks or cracks when tested at 35° F., and in that when the coating composition is deposited on a metallic substrate and cured, the coated substrate has a Sward hardness of at least 14; said coating composition contains a film-former comprising a polyester-urethane polyol and a curing agent; the polyester-urethane polyol has a hydroxyl value of at least 50 and comprises (A) about 60 to 95 percent by weight acyclic moieties, and optionally (B) up to 30 percent by weight cyclic moieties; the sum of the weight percentage of cyclic moieties and the weight percentage of urethane moieties multiplied by 3 is from about 15 to 65. The weight percent is based on the total weight of the polyester-urethane polyol.

The coating compositions of this invention are of high solids type, that is, they are sprayable at high solids content. The sprayability is the maximum concentration of solids at which the coating composition can be atomized sufficiently to form a uniformly deposited coating, under normal spraying conditions of, say, temperature, pressure, and spray equipment design such as entails the use of an air suction spray gun operating at 60 psi with a No. 30 air cap. This maximum concentration is solvent dependent and usually occurs in a viscosity range of 15–19 seconds with a No. 4 Ford cup at room temperature after thinning with a solvent such as a mixture of methyl amyl ketone and 2-ethoxyethylacetate. Above this maximum concentration, appearance, leveling and solvent popping typically become unacceptable. With the high solids, the desired coating thickness and appearance is obtained without enumerable coating applications. Additionally, coating compositions of this type meet air pollution standards which require a reduction of organic solvent emissions of today's organic solvent-based coating compositions.

In this context, by the term "thermosetting" is meant that the coating composition, upon heating, will solidify or set to form a coating which will not remelt on further heating.

The flexibility property of the coating can be determined by spray coating an elastomeric substrate and curing the coating at optimum conditions to give a dry film thickness of 1.5 to 2 mils. The elastomeric substrate is 1/16 to 3/16, typically ⅛-inch thick, thermoplastic polyurethane, such as commercially available from Mobay Company as TEXIN 355D. The coated substrate is bent around a ½-inch diameter mandrel with the coating side facing outward. After bending, the coating is examined for breaks and cracks. Testing can be conducted at standard temperatures such as room temperature, that is, 72°–77° F., or at lower temperatures. The lower temperatures can be obtained by cooling the substrate to standard temperatures of 45° F., 35° F., or 0° F. before bending. The lower the temperature, the more stringent the test. Preferably, the coating can withstand bending at 20° F., more preferably 0° F. The flexibility property of the coating is considered as good when there is no break in the coating or substantially no break, i.e., when the occurring break is not completely across the width of the substrate which is about 1 to 3 inches, at the measured temperature.

The hardness property of the coating composition can be determined by the Sward method using a Sward Rocker as described in ORGANIC COATING TECHNOLOGY, Payne, Vol. 1, 1965, pages 642–643. Testing is done on an optimally cured coating having a dry film thickness of 1½ to 2 mils over 20 gauge steel panels.

The hydroxyl value of the polyester-urethane polyol of the coating compositions is determined according to ASTM-E-222-76, Method B (reflux one hour). In the context of the foregoing, the invention is more fully described hereinbelow.

DETAILED DESCRIPTION OF THE INVENTION

The coating compositions of the present invention are of one-component, high solids type, and have, conjointly, the properties of hardness and flexibility. Preferably, for automotive topcoat usage, the coating composition will be formulated to be weather durable. More specifically, the coating compositions have a sprayability of at least 40 percent, and are capable of producing cured coatings having a flexibility to withstand ½-inch mandrel bend at 35° F. (2° C.) and a Sward hardness of at least 14. Weather-durability can be predicted in certain instances by accelerated tests.

The sprayability of the coating composition is preferably about 45 percent and more preferably about 55 percent by weight.

The flexibility and hardness properties are imparted to the coating composition by the acyclic and cyclic content as well as the urethane content of the polyester-urethane polyols present therein. By cyclic content is meant the weight percent of the ring component of the polyester-urethane polyol, e.g.,

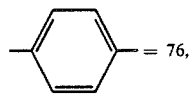 = 76, based on its total weight. By urethane content is meant the weight percent of the component which is of the structure:

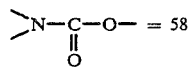 = 58 in the polyester-urethane polyol based on its total weight. By acyclic content is meant the weight percent of the component other than the aforedescribed cyclic and urethane moieties of the polyester-urethane polyol.

To impart the required flexibility, the reactants are selected on the basis that they provide acyclic moieties in the reaction product in an amount sufficient to provide a cured coating with a flexibility to withstand at least ½-inch mandrel bend at 35° F., preferably at 20° F. and more preferably at 0° F. Accordingly, the polyester-urethane polyol typically contains from about 60 to 95, and preferably from about 75 to 85 percent acyclic moieties.

To impart the required hardness, the reactants are selected on the basis that they provide urethane moieties and/or cyclic moieties in the resultant polyester-urethane polyols in an amount sufficient to provide cured coatings with a Sward hardness of at least 14, preferably 18, and more preferably 30. Accordingly, the polyester-urethane polyol typically contains up to about 30, and preferably from about 10 to 25 percent cyclic moieties.

In providing the required hardness, the amounts of the cyclic moieties and the urethane moieties can be adjusted. Accordingly, the cyclic moieties and the urethane moieties are in the following relationship. On a formula weight basis, the sum of the cyclic moieties and three times the sum of the urethane moieties in the polyester-urethane polyol is in the range of 15 to 65 and preferably from 35 to 55. Accordingly, the polyester-urethane polyol contains from about 1 to 20 percent and preferably 5 to 10 percent by weight urethane moieties.

Preferably, the coating compositions of the invention will be durable to weathering. This property is usually evaluated by outdoor exposure in Florida. Preferably, coating compositions of the invention, when properly evaluated, will be able to withstand one-year exposure in Florida while maintaining at least 30 percent of their initial gloss.

In preparing the polyester-urethane polyol, an organic polyisocyanate is reacted with a polyester-polyol which is formed from the reaction of an organic polycarboxylic acid and a polyol.

The organic polyisocyanate useful herein can be an aliphatic or an aromatic polyisocyanate or a mixture thereof. Aliphatic polyisocyanates (including cycloaliphatic polyisocyanates) are preferred because of better durability in the resultant coating. Diisocyanates are preferred, although higher functional polyisocyanates such as triisocyanates can be used, preferably in admixture with the diisocyanates. However, their use does result in some chain branching which results in increased viscosity and difficulties in formulating the high solids coatings of the invention. Non-limiting examples of suitable diisocyanates are 4,4'-diphenylmethane diisocyanate, 1,4-tetramethylene diisocyanate, isophorone diisocyanate, trimethylhexamethylene diisocyanate, tetramethylxylene diisocyanate, 1,6-hexamethylene diisocyanate, isocyanurate from isophorone isocyanate, available from Veba Company as T1890, the biuret from 1,6-hexamethylene diisocyanate, available from Mobay Chemical Company as DESMODUR N, and 4,4'-methylene-bis-(cyclohexyl isocyanate). Examples of suitable higher functionality polyisocyanates are polymethylene polyphenyl isocyanates. The reaction of the isocyanates, it is noted, provides the urethane moieties which impart hardness. It is also noted that to the extent that the isocyanates contain cyclic and acyclic groups, they will contribute, respectively, to hardness and flexibility of the coating.

The polyester-polyol is prepared preferably by reacting an organic polycarboxylic acid or a functional equivalent thereof such as an anhydride or a lower alkyl ester, with an organic polyol. The organic polycarboxylic acid preferably contains cyclic moieties. Diacids are preferred, although higher functional polyacids can be used, preferably in admixture with the diacids. Non-limiting examples of the cyclic polycarboxylic acids or their functional equivalents are o-phthalic acid, isophthalic acid, terephthalic acid, o-hexahydrophthalic acid, m-hexahydrophthalic acid, p-hexahydrophthalic acid, tetrahydrophthalic acid or a hydrocarbyl-substituted hexahydrophthalic acid wherein the hydrocarbyl group can be an alkyl, alkenyl or aryl group. Of these acids, the aliphatic one such as hexahydrophthalic acid or its anhydride is preferred.

Besides the cyclic polycarboxylic acids or their functional equivalents, acyclic polycarboxylic acids containing from at least 2, preferably about 2 to 20 carbon atoms may also be employed. Examples thereof include succinic acid, glutaric acid, adipic acid, suberic acid and sebacic acid. Further, mixtures of cyclic polycarboxylic acid with acyclic carboxylic acid can be employed.

The polyols employed in the preparation of the polyester can be cyclic or acyclic and preferably are aliphatic polyols. Diols are preferred, although higher functional polyols such as triols can be used, preferably in admixture with the diols. Examples of the cyclic polyols are bisphenol A, hydrogenated bisphenol A, cyclohexanediol and cyclohexanedimethanol. Examples of the acyclic polyols are those containing, preferably, from about 2 to 18 carbon atoms. Non-limiting examples of the acyclic polyols are 2,2,4-trimethyl-1,3-pentanediol, 1,4-butanediol, neopentyl glycol, and 1,6-hexanediol. Mixtures of the polyols, for example, cyclic and acyclic polyols, can be employed. Preferably, the polyol contains neopentyl group branching such as derived from neopentyl glycol and 2,2-dimethyl-3-hydroxypropyl-2,2-dimethyl-3-hydroxypropionate. Typically, the polyester will contain from about 10 to 60, more preferably from about 15 to 40 percent by weight of the alcohol branched neopentyl groups. The percentage by weight is based on the weight of the polyol which contains the neopentyl branching divided by the total weight of the polyol ingredients which are used in preparing polyester polyols. While the use of diols is preferred herein, higher functionality polyols such as triols can be used, preferably in admixture with the diols. An example of the higher functional polyol is trimethylolpropane.

The reaction of the acid with the polyol is an esterification reaction which is well known in the art. In accordance with this invention, the resultant polyester is hydroxyl-functional. It is of a low molecular weight, preferably with a hydroxyl value of about 150 to 350. Preferably, the polyesters will contain some residual acid groups. Typically, the polyester will have an acid value of up to 15.

Polyester polyols prepared by other methods and/or with other ingredients can also be used in this invention. For example, polyester polyols from lactones can be prepared by subjecting a lactone to polymerization in the presence of a low molecular weight polyol such as ethylene glycol, diethylene glycol, triethylene glycol, 1,4-butanediol, propylene glycol and cyclohexane dimethanol. This and other methods of preparing polyester polyols in accordance with this invention are hereby encompassed.

The organic polyisocyanate is reacted with the polyester polyol to produce a polyester-urethane polyol having a hydroxyl value of at least 50. Preferably, the hydroxyl value is within the range of about 140 to 250.

It is desired to point out that the isocyanates, the acids and polyols described hereinabove can have substituents provided that the substituents do not adversely affect the reaction or utility of the resultant composition. The substituent can be a thio group, a halogen group, or the like.

The polyester-urethane polyol described above preferably has a calculated number average molecular weight of from about 300 to 2000.

Hydroxyl values lower than 50 are generally less preferred because of higher resin viscosities and the difficulties associated in formulating high solids coating compositions. Hydroxyl values much higher than 250 are generally less preferred because of insufficient flexibility in the resultant coating.

In the practice of the invention, the polyester-urethane polyol is employed in combination with curing agent which is capable of reacting with the active hydrogens in the polyester-urethane polyol to give a thermosetting coating. Examples of curing agents are aminoplasts and blocked isocyanates. Usually, a cure catalyst is employed.

Aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates or diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuryl may be used.

The aminoplast contains methylol or similar alkylol groups and preferably at least a portion of these alkylol groups are etherified by reaction with an alcohol to provide organic solvent-soluble resins. Any monohydric alcohol can be employed for this purpose including such alcohols as methanol, ethanol, butanol and hexanol. The cure catalysts usually employed are dodecylbenzene sulfonic acid, para-toluene sulfonic acid and butyl stannoic acid.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof.

Blocked polyisocyanates may also be used as curing agents. Examples of suitable polyisocyanates that can be blocked include monomeric polyisocyanates such as toluene diisocyanate and 4,4'-methylene-bis(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commercially available from Mobay Chemical as DESMODUR N. The polyisocyanate is blocked with suitable blocking agents which would unblock at elevated temperatures such as low aliphatic alcohols such as methanol, oximes such as methyl ethyl ketone oxime, and lactams such as caprolactam.

The amounts of polyester-urethane polyol and curing agent which are used in the practice of the invention are preferably adjusted so that the ratio of polyester-urethane polyol:curing agent is within the range of 6 to 0.5:1, preferably 3 to 1:1. Ratios of polyester-urethane polyol:curing agent greater than 6:1 are not preferred because hardness and durability of the resultant coating will suffer; whereas ratios less than 0.5:1 are not preferred because flexibility of the resultant coating will suffer.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention are of the high solids type, a liquid diluent is usually present in the composition. By liquid diluent is meant a solvent or non-solvent which is volatile and is removed after the coating is applied and is needed to reduce viscosity sufficiently to enable forces available in simple coating techniques, namely, spraying, to spread the coating to controllable, desired and uniform thicknesses. Also, diluents assist in substrate wetting, resinous component compatibility, package stability and coalescence or film formation. Examples of suitable diluents include aromatic hydrocarbons such as toluene and xylene, ketones such as methyl ethyl ketone and methyl isobutyl ketone, alcohols such as isopropyl alcohol, normal-butyl alcohol, monoethers of glycols such as the monoethers of ethylene glycol and diethylene glycol, monoether glycol acetates such as 2-ethoxyethyl acetate, as well as compatible mixtures thereof. The diluent is present in amounts up to 60 percent by weight, usually 35 to 55 percent by weight, based on total weight of diluent and resin solids.

In addition to the above ingredients, various fillers, plasticizers, anti-oxidants, U.V. light absorbers, flow control agents, surfactants and other formulating additives can be employed if desired. These materials are optional and generally constitute up to about 10 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating including brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings are particularly useful on resilient and rubbery substrates, elastomeric parts, plastics, and on metal surfaces such as steel and aluminum. In accordance with this invention, the same coating composition can be used to coat an article having elastomeric and metallic parts. Hence, automobiles, for example, can be assembled and painted with the same coating in accordance with this invention. Since the same coating is employed, it is relatively easier to obtain color matching.

The combination of outstanding properties of the coating compositions of the present invention make them useful for a wide variety of applications. They can be used for coating automotive parts such as automobile bodies and truck cabs. Also, they can be used for other coating applications such as coatings for appliance parts such as refrigerators and washing machines, and they can also be used for coil coating applications.

In general, coating thickness will vary depending upon the application desired. In general, coatings from about 0.5 to 3 mils have been found to be useful in most applications.

After application to the substrate, the coatings are cured. Curing is usually conducted at temperatures of about 100° to 200° C., and in most cases, a cure schedule is from about 20 to 30 minutes at about 120 to 150° C. Higher or lower temperatures with correspondingly shorter or longer times can be utilized, although the exact cure schedule best employed depends upon the nature of the substrate as well as the particular components used in formulating the coating compositions.

The coating compositions of the present invention can be applied to the substrate in a clear-over-color application in which a pigmented or colored base coat is first applied to a substrate, followed by application of a clear top coat.

The following examples illustrate the invention. All quantities are on a weight basis unless otherwise indicated.

EXAMPLE 1

Part 1

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 7165.2 |
| 1,6-Hexanediol | 5493 |
| Neopentyl glycol | 4841.6 |

The above ingredients were charged to a properly equipped reaction vessel and the resultant mixture heated to react in a nitrogen atmosphere. At 170° C. (338° F.), there resulted the production of water of (esterification) reaction. With the continuous removal of the water, heating was continued to 200° C. (392° F.). The reaction mixture was then held at 200° C. (392° F.) for about 9 hours until an acid value of about 9.5 was attained. The resultant mixture was then cooled to a temperature of about 70° C. (158° F.), discharged and analyzed.

Analysis: Theoretical solids content was 100 percent, viscosity was 95.6 stokes, acid value was 9.5 and hydroxyl value was 319.5.

Part 2

A polyester-urethane polyol was prepared with the above polyester-polyol composition, as follows:

| Ingredients | Parts by Weight (grams) |
| --- | --- |
| The polyester-polyol (as described above) | 8100 |
| Trimethyl hexamethylene diisocyanate | 1429 |
| Dibutyltin dilaurate | 0.95 |
| Methylisobutyl ketone | 1058 |

The above ingredients were charged to a properly equipped reaction vessel and the resultant mixture heated to react in a nitrogen atmosphere to a temperature of 110° C. (230° F.). The reaction mixture was held at this temperature for about 2½ hours until all the isocyanate had reacted. The resultant composition was discharged and analyzed.

Analysis: Theoretical solids content was 90 percent, acid value was 7.9 and hydroxyl value was 180.2.

Part 3

A high solids, thermosetting composition was prepared with the above polyester-urethane polyol, as follows. The polyester-urethane polyol was formulated with an aminoplast curing agent and other ingredients listed below.

| Ingredients | Parts by Weight (grams) |
| --- | --- |
| The polyester-urethane composition | 75 |
| Melamine[1] | 25 |
| Polymeric microparticle[2] | 2 |
| Cellulose acetate butyrate | 1 |
| U.V. absorber[3] | 2 |
| Flow control agent | 0.25 |
| U.V. stabilizer[4] | 0.5 |
| Dodecylbenzene sulfonic acid | 0.3 |
| Thinning solvent[5] | 65.2 |

[1]CYMEL 303 available from American Cyanamid Company.
[2]Prepared as described in Example II of U.S. Pat. No. 4,147,688.
[3]Available from Ciba-Geigy Company as TINUVIN.
[4]Available from Ciba-Geigy Company aa TINUVIN.
[5]Methyl amyl ketone/cellulose acetate.

The coating composition had a sprayable resin solids content of 59 percent by weight. This coating composition was sprayed on a ⅛-inch thick thermoplastic polyurethane commercially available from Mobay as TEXIN 355D and as a clear coat on a metal substrate. The obtained films were baked at 250° F. (121° C.) for 30 minutes and then subjected to hardness and flexibility tests with the following results: The coated substrates exhibited Sward hardness of 26, and withstood a ½-inch mandrel test at 20° F. without a substantial break.

EXAMPLE 2

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Isophthalic acid | 1497.4 |
| 1,6-Hexanediol | 1064.4 |
| Neopentyl glycol | 938.1 |
| Butyl stannoic acid | 0.35 |

The method of preparation was essentially the same as described in Example 1, part 1.

Analysis of the resultant composition was as follows: Theoretical solids content was 100 percent, viscosity (stokes) was 450, acid value was 6.3 and hydroxyl value was 308.8.

A polyester-urethane polyol was prepared with the above polyester-polyol composition, as follows:

| Ingredients | Parts by Weight (grams) |
| --- | --- |
| The polyester-polyol (as described above) | 8100 |
| Trimethyl hexamethylene diisocyanate | 1429 |
| Dibutyltin dilaurate | 0.95 |
| Methylisobutyl ketone | 1058 |

The method of preparation was essentially the same as described in Example 1, part 2.

Analysis of the resultant composition was as follows: Theoretical solids content was 90 percent, viscosity (stokes) was 300, acid value was 4.9 and hydroxyl value was 165.6.

A high solids, thermosetting coating composition was prepared with the above polyester-urethane polyol. The polyester-urethane polyol was formulated with 20 percent aminoplast curing agent, and other ingredients which were essentially the same as listed in Example 1, part 3.

The coating composition had a sprayable resin solids content of 50 percent by weight. This coating composition was sprayed on a ⅛-inch thick thermoplastic polyurethane commercially available from Mobay as TEXIN 355D, and a metal substrate. The obtained films were baked at 250° F. (121° C.) for 30 minutes and then subjected to hardness and flexibility tests with the following results: The coated substrates exhibited Sward hardness of 46, and withstood a ½-inch mandrel test at 20° F. without a substantial break.

EXAMPLE 3

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 5465.5 |
| 1,6-Hexanediol | 4190 |
| Neopentyl glycol | 3693 |

The method of preparation was essentially the same as described in Example 1, part 1.

Analysis of the resultant composition was as follows: Theoretical solids content was 100 percent, viscosity (stokes) was 95.1, acid value was 9.9 and hydroxyl value was 308.7.

A polyester-urethane polyol was prepared with the above polyester-polyol composition, as follows:

| Ingredients | Parts by Weight (grams) |
| --- | --- |
| The polyester-polyol (as described above) | 8100 |
| DESMODUR N-100[1] | 1429 |
| Dibutyltin dilaurate | 0.95 |

[1]Acyclic triisocyanate, available from Mobay Chemicals.

The method of preparation was essentially the same as described in Example 1, part 2.

Analysis of the resultant composition was as follows: Theoretical solids content was 90 percent, acid value was 6.8 and hydroxyl value was 152.4.

EXAMPLE 4

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1151.70 |
| 1,6-Hexanediol | 1103.09 |
| Neopentyl glycol | 972.22 |
| Adipic acid | 272.96 |
| Butyl stannoic acid (catalyst) | 0.35 |

The method of preparation was essentially the same as described in Example 1, part 1.

Analysis of the resultant composition was as follows: Theoretical solids content was 90 percent, viscosity (stokes) was 4.39, acid value was 5.8 and hydroxyl value was 288.4.

A polyester-urethane polyol was prepared with the above polyester-polyol composition, as follows:

| Ingredients | Parts by Weight (grams) |
| --- | --- |
| The polyester-polyol (as described above) | 950 |
| Trimethyl hexamethylene diisocyanate | 150 |
| Dibutyltin dilaurate | 0.1 |

The method of preparation was essentially the same as described in Example 1, part 2.

Analysis of the resultant composition was as follows: Theoretical solids content was 90 percent, viscosity (stokes) was 50, acid value was 4.9 and hydroxyl value was 180.4.

A high solids, thermosetting coating composition was prepared with the above polyester-urethane polyol and used, as follows. The polyester-urethane polyol was formulated with an aminoplast curing agent at 25 percent by weight and other ingredients which were essentially the same as listed in Example 1, part 3. The percentage by weight was based on the total weight of the composition.

The coating composition had a sprayable resin solids content of 60 percent by weight. This coating composition was sprayed on a ½-inch thick thermoplastic polyurethane commercially available from Mobay as TEXIN 355D, and a metal sustrate. The obtained films were baked at 250° F. (121° C.) for 30 minutes and then subjected to hardness and flexibility tests with the following results: The coated substrates exhibited Sward hardness of 22, and withstood a ½-inch mandrel test at 20° F. without breaking.

EXAMPLE 5

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1132.4 |
| 1,6-Hexanediol | 867.6 |
| ESTER DIOL 204[1] | 1500.0 |

[1] 2,2-Dimethyl-3-hydroxypropyl-2,2-dimethyl-3-hydroxypropionate available from Union Carbide Corporation.

The method of preparation was essentially the same as described in Example 1, part 1.

Analysis of the resultant composition was as follows: Theoretical solids content was 100 percent, viscosity (stokes) was 83.5, acid value was 10.9 and hydroxyl value was 233.6.

A polyester-urethane polyol was prepared with the above polyester-polyol composition, as follows:

| Ingredients | Parts by Weight (grams) |
| --- | --- |
| The polyester-polyol (as described above) | 850 |
| Trimethyl hexamethylene diisocyanate | 150 |
| Dibutyltin dilaurate | 0.1 |
| Methylisobutyl ketone (90% solids) | 111 |

The method of preparation was essentially the same as described in Example 1, part 2.

Analysis of the resultant composition was as follows: Theoretical solids content was 90 percent, viscosity (stokes) was 103.8, acid value was 8.13 and hydroxyl value was 105.53.

EXAMPLE 6

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1143 |
| 1,6-Hexanediol | 1314 |
| Neopentyl glycol | 772 |
| Adipic acid | 271 |
| Butyl stannoic acid | 0.35 |

The method of preparation was essentially the same as described in Example 1, part 1.

Analysis of the resultant composition was as follows: Theoretical solids content was 100 percent, viscosity (stokes) was 23.8, acid value was 7.75 and hydroxyl value was 312.15.

A polyester-urethane polyol was prepared with the above polyester-polyol composition, as follows:

| Ingredients | Parts by Weight (grams) |
| --- | --- |
| The polyester-polyol (as described above) | 850 |
| Trimethyl hexamethylene diisocyanate | 150 |
| Dibutyltin dilaurate | 0.1 |
| Methylisobutyl ketone | 111 |

The method of preparation was essentially the same as described in Example 1, part 2.

Analysis of the resultant composition was as follows: Theoretical solids content was 90 percent, viscosity (stokes) was 34.6, acid value was 7.5 and hydroxyl value was 164.0.

A high solids, thermosetting coating composition was prepared with the above polyester-urethane polyol and used, as follows. The polyester-urethane polyol was formulated with an aminoplast curing agent and other ingredients which were essentially the same as listed in Example 1, part 3.

The coating composition had a sprayable resin solids content of 60 percent by weight. This coating composition was sprayed on a ⅛-inch thick thermoplastic polyurethane commercially available from Mobay as TEXIN 355D, and a metal substrate. The obtained films were baked at 250° F. (121° C.) for 30 minutes and then subjected to hardness and flexibility tests with the following results: The coated substrates exhibited Sward hardness of 18, and withstood a ½-inch mandrel test at 20° F. without breaking.

EXAMPLE 7

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1625.4 |
| 1,6-Hexanediol | 996.4 |
| Neopentyl glycol | 878.2 |

The method of preparation was essentially the same as described in Example 1, part 1.

Analysis of the resultant composition was as follows: Theoretical solids content was 100 percent, viscosity (stokes) was 364.0, acid value was 11.6 and hydroxyl value was 208.4.

A polyester-urethane polyol was prepared with the above polyester-polyol composition, as follows:

| Ingredients | Parts by Weight (grams) |
| --- | --- |
| The polyester-polyol (as described above) | 900 |
| Trimethyl hexamethylene diisocyanate | 100 |
| Dibutyltin dilaurate | 0.1 |
| Methylisobutyl ketone | 250 |

The method of preparation was essentially the same as described in Example 1, part 2.

Analysis of the resultant composition was as follows: Theoretical solids content was 100 percent, viscosity (stokes) was 8.27, acid value was 8.5 and hydroxyl value was 108.7.

A high solids, thermosetting coating composition was prepared with the above polyester-urethane polyol and used, as follows. The polyester-urethane polyol was formulated with an aminoplast curing agent and other ingredients which were essentially the same as listed in Example 1, part 3.

The coating composition had a sprayable resin solids content of 55 percent by weight. This coating composition was sprayed on a ⅛-inch thick thermoplastic polyurethane commercially available from Mobay as TEXIN 355D, and a metal substrate. The obtained films were baked at 250° F. (121° C.) for 30 minutes and then subjected to hardness and flexibility tests with the following results: The coated substrates exhibited Sward hardness of 22, and withstood a ½-inch mandrel test at 20° F. without breaking.

EXAMPLE 8

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1118.25 |
| 1,6-Hexanediol | 1071.05 |
| Neopentyl glycol | 943.98 |
| Sebacic acid | 366.70 |
| Butyl stannoic acid | 0.35 |

The method of preparation was essentially the same as described in Example 1, part 1.

Analysis of the resultant composition was as follows: Theoretical solids content was 100 percent, viscosity (stokes) was 29.96, acid value was 8.09 and hydroxyl value was 302.59.

A polyester-urethane polyol was prepared with the above polyester-polyol composition, as follows:

| Ingredients | Parts by Weight (grams) |
| --- | --- |
| The polyester-polyol (as described above) | 425 |
| Trimethyl hexamethylene diisocyanate | 75 |
| Dibutyltin dilaurate | 0.060 |
| Methylisobutyl ketone | 56 |

The method of preparation was essentially the same as described in Example 1, part 2.

Analysis of the resultant composition was as follows: Theoretical solids content was 90 percent, viscosity (stokes) was 31.50, acid value was 6.2 and hydroxyl value was 167.8.

A high solids, thermosetting coating composition was prepared with the above polyester-urethane polyol and used, as follows. The polyester-urethane polyol was formulated with an aminoplast curing agent and other ingredients which were essentially the same as listed in Example 1, part 3.

The coating composition had a sprayable resin solids content of 57 percent by weight. The coating composition was sprayed on a ⅛-inch thick thermoplastic polyurethane commercially available from Mobay as TEXIN 355D, and a metal substrate. The obtained films were baked at 250° F. (121° C.) for 30 minutes and then subjected to hardness and flexibility tests with the following results: The coated substrates exhibited Sward hardness of 28, and withstood a ¼-inch mandrel test at 20° F. without breaking.

We claim:

1. A high solids, solvent-based, thermosetting, one-component coating composition having a sprayability of at least 40 percent, which when cured is flexible and hard in that when the coating composition is deposited on an elastomeric substrate and cured, the coated substrate can be bent around a ½-inch mandrel with the coating facing outwardly and the coating exhibits substantially no breaks or cracks when tested at 35° F.; and in that when the coating composition is deposited on a metallic substrate and cured, the coated substrate has a Sward hardness of at least 14; said coating composition contains a film-former comprising a polyester-urethane polyol and a curing agent; the polyester-urethane polyol has a hydroxyl value of at least 50 and comprises:
(A) about 60 to 95 percent by weight acyclic moieties, and optionally
(B) up to about 30 percent by weight cyclic moieties; the sum of the weight percentage of cyclic moieties and the weight percentage of urethane moieties multiplied by 3 is from about 15 to 65.

2. A composition of claim 1, wherein the polyester-urethane polyol has a hydroxyl value of 140 to 250.

3. A composition of claim 1, wherein the polyester-urethane polyol contains from about 10 to 25 percent cyclic moieties.

4. A composition of claim 1, wherein the polyester-urethane polyol contains from about 1 to 20 percent urethane moieties.

5. A composition of claim 1, wherein the polyester-urethane polyol contains from about 5 to 10 percent urethane moieties.

6. A composition of claim 1, wherein the curing agent is a blocked isocyanate, an aminoplast or phenoplast.

7. A composition of claim 1, wherein the polyester-urethane polyol is prepared by reacting an organic polyisocyanate with a polyester polyol formed from reacting an organic polycarboxylic acid with a polyol.

8. A composition of claim 7, wherein the organic polycarboxylic acid is a dicarboxylic acid or a derivative thereof and the polyol is a diol.

9. A composition of claim 8, wherein the organic dicarboxylic acid contains cyclic groups.

10. The composition of claim 9, wherein the organic dicarboxylic acid is selected from the class consisting of o-phthalic, isophthalic, terephthalic, o-hexahydrophthalic, p-hexahydrophthalic, iso-hexahydrophthalic, tetrahydrophthalic or hydrocarbyl-substituted hexahydrophthalic acid or a derivative thereof, wherein the hydrocarbyl group is an alkyl, alkaryl or aryl group.

11. A composition of claim 10, wherein the organic dicarboxylic acid is aliphatic and is selected from the group consisting of hexahydrophthalic acid and methyl hexahydrophthalic acid.

12. A composition of claim 8, wherein the diol is aliphatic.

13. The composition of claim 12, wherein the aliphatic diol is a mixture of a straight chain diol containing from 2 to 20 carbon atoms and a diol containing neopentyl group branching.

14. A composition of claim 7, wherein the polyisocyanate is a diisocyanate.

15. A composition of claim 14, wherein the diisocyanate is aliphatic.

16. The composition of claim 15, wherein the diisocyanate contains alkyl branching.

17. A composition of claim 16, wherein the aliphatic diisocyanate is trimethylhexamethylene diisocyanate.

18. The composition of claim 1 which contains from 10 to 60 percent by weight neopentyl group branching.

19. A composition of claim 7 in which the equivalent ratio of polyol to polycarboxylic acid is about 2:1 and the equivalent ratio of polyisocyanate to polyester polyol is about 1:3-4.

20. A high solids, solvent-based, thermosetting, one-component coating composition having a sprayability of at least 40 percent, which when cured is weather-durable, and flexible and hard in that when the coating composition is deposited on an elastomeric substrate and cured, the coated substrate can be bent around a ½-inch mandrel with the coating facing outwardly and the coating exhibits substantially no breaks or cracks when tested at 20° F.; and in that when the coating composition is deposited on a metallic substrate and cured, the coated substrate has a Sward hardness of at least 18; said coating composition contains a film-former comprising a polyester-urethane polyol and a curing agent; the polyester-urethane polyol has a hydroxyl value of at least 80 and is prepared by reacting:
(1) an aliphatic diisocyanate containing alkyl branching with
(2) a polyester polyol formed from reacting:
    (a) hexahydrophthalic acid or alkyl-substituted hexahydrophthalic acid with
    (b) a mixed diol comprising:
        (i) a straight chain aliphatic diol containing from 2 to 20 carbon atoms,
        (ii) an aliphatic diol containing neopentyl group branching;
said polyester-urethane polyol containing 70 to 95 percent by weight acyclic moieties and the sum of the weight percentage of cyclic moieties and the weight percentage of urethane moieties multiplied by 3 is from 15 to 65.

21. A composition of claim 20, wherein the diisocyanate is trimethylhexamethylene diisocyanate.

22. A composition of claim 20, wherein the acid is hexahydrophthalic.

23. A composition of claim 20, wherein the diol containing the neopentyl groups is neopentyl glycol.

24. A composition of claim 20, wherein the straight chain diol is 1,6-hexanediol.

25. A composition of claim 20, wherein the equivalent ratio of diol to diacid is about 2:1 and the equivalent ratio of the diisocyanate to the polyester polyol is about 1:3-4.

* * * * *